(12) United States Patent
Ko

(10) Patent No.: US 7,134,450 B2
(45) Date of Patent: Nov. 14, 2006

(54) INTERIOR STRUCTURE OF WATER CONTROL VALVE FOR FAUCETS

(75) Inventor: Shi Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 60 days.

(21) Appl. No.: 11/072,341

(22) Filed: Mar. 7, 2005

(65) Prior Publication Data

US 2006/0196564 A1    Sep. 7, 2006

(51) Int. Cl.
*F16K 3/04* (2006.01)
(52) U.S. Cl. .................................. 137/625.31
(58) Field of Classification Search ........... 137/625.31, 137/625.46
See application file for complete search history.

(56) References Cited

U.S. PATENT DOCUMENTS

| | | | | |
|---|---|---|---|---|
| 3,780,758 | A * | 12/1973 | DeVries | 137/454.6 |
| 4,821,765 | A * | 4/1989 | Iqbal et al. | 137/270 |
| 4,880,209 | A * | 11/1989 | Bernat | 251/363 |
| 5,107,884 | A * | 4/1992 | Orlandi | 137/454.5 |
| 5,681,028 | A * | 10/1997 | Cook et al. | 251/170 |
| 6,220,294 | B1 * | 4/2001 | Ko | 137/625.31 |
| 6,422,268 | B1 * | 7/2002 | Fleig et al. | 137/625.31 |

* cited by examiner

Primary Examiner—John Fox
(74) Attorney, Agent, or Firm—Troxell Law Office, PLLC

(57) ABSTRACT

An interior structure of a water control valve for faucets includes a control valve body, a control valve stem, and a valve plug wherein the control valve body has an upper coupling end with a valve stem hole defined therein disposed at the upper step thereof, a pair of symmetrical positioning slide blocks with an inner valve chamber disposed at the lower step thereof, and a pair of symmetrical water outlet ports with retaining grooves defined thereon in communication with the valve chamber thereof. The control valve stem has an upper engaging end, an abutting block properly disposed thereon, and a linkage rib extending at the bottom side thereof. A stop disc is provided with a central elongate inserting slot and a pair of abutting flanges symmetrically extending at the outer edge thereon. An upper switch valve with plane edges symmetrically cut at both sides thereof has a central elongate inserting recess, and water inlet chambers properly defined therein. A lower switch valve has a pair of protrusive locating blocks symmetrically disposed at the outer periphery thereof, water inlet ports disposed at the top surface thereon, and a connecting cavity disposed at the inner bottom end therein. The valve plug has a stepwise central water inlet hole to form a support face therein, an upper connecting end with a retaining space defining the outer periphery thereon and an upper water sealing ring protruding at the upper edge thereon, and a plurality of lower water sealing rings mounted at the lower end thereof so that the valve plug can be accurately engaged with the lower switch valve to achieve the best leakage-proof effect in water supply thereby.

3 Claims, 6 Drawing Sheets

INTERIOR STRUCTURE OF WATER CONTROL VALVE FOR FAUCETS

BACKGROUND OF THE INVENTION

The present invention is related to an interior structure of a water control valve for faucets, including a control valve body, a control valve stem, and a valve plug wherein the valve plug, integrally made of rubber, is equipped with a connecting end protruding at the upper side thereof to be mutually engaged with a connecting cavity of a lower switch valve thereby, and a plurality of upper and lower water sealing rings mounted at predetermined positions thereon; therefore, in the status of water supply, the upper/lower water sealing rings of the valve plug will be expanded outwards by water flow to respectively abut tight and close against the inner wall of the connecting cavity of the lower switch valve and that of a valve chamber of the control valve body for more accurate and secure mutual engagement therewith so as to achieve the best leakage-proof effect thereby.

Please refer to FIG. 1. A conventional water control valve for faucets includes a control valve body 10, a control valve stem 20, and a valve plug 30. The control valve body 10, made in a two-stepwise cylindrical shape, is equipped with a coupling end 11 disposed at the upper step thereof to be mutually engaged with a seat cover B of a faucet handle A thereby, a valve stem hole 12 properly defining the interior of the upper step thereof, a pair of positioning slide blocks 13 symmetrically extending at the upper section of the lower step thereof, and two sealing O-rings 14 mounted at the middle section of the lower step thereof. Inside the lower step of the control valve body 10 thereof is disposed a three-staged valve chamber 15 that, having a lower opening to be communicated with the valve stem hole 12 thereof, is made up of a smaller-diameter upper stage, a medium-diameter middle stage with a pair of limiting blocks 151 symmetrically protruding at the bottom edge thereon, and a larger-diameter lower stage with a pair of water outlet ports 16 symmetrically cut at proper positions thereon to be mutually connected with the valve chamber 15 thereof and with a pair of retaining grooves 161 symmetrically preset at the water outlet ports 16 thereof. The control valve stem 20 is equipped with an upper engaging end 201 to be mutually registered with the faucet handle A thereby, a plurality of water sealing rings 202 mounted at preset positions thereon, an abutting block 203 with a retaining ring 204 having a pair of symmetrical stop protrusions 2041 properly disposed thereof, and a linkage rib 205 extending at the bottom side thereon. A stop disc 21 is equipped with an elongated inserting slot 211 disposed at the center thereof and a pair of abutting flanges 212 symmetrically extending downwards at the bottom outer edge thereon. An upper switch valve 22 and a lower switch valve 23 are integrally made of ceramic material wherein the upper switch valve 22, made in an annular disc with plane edges symmetrically cut at both sides thereof, is provided with an elongated inserting recess 221 indented at the center of the top side thereon, and triangular water inlet chambers 222 each defined by an arched side tilting downwards from both cut edges to the central point thereof. The lower switch valve 23, made in a disk shape, has a pair of protrusive locating blocks 231 symmetrically disposed at both sides of the outer periphery thereof, and a plurality of quarter-shaped water inlet ports 232 distributed at the top surface thereon. The valve plug 30 is made in an annular shape, having a water inlet hole 31 disposed at the center thereof, a coupling end 62 extending at the upper side thereof, a positioning flange 33 extending at the lower side, and an upper packing ring 321 and a lower packing ring 322 mounted at the upper and bottom sides thereof respectively.

Please refer to FIG. 2. In assembly, the control valve stem 20 is joined to the valve chamber 15 of the control valve body 10 thereof, permitting the upper engaging end 201 thereof to extend outside the valve stem hole 12 of the control valve body 10 and the abutting block 203 to locate precisely between the limiting blocks 151 thereof for movement limited within 90 degrees therein. Then, the stop disc 21 is placed into the valve 15 of the control valve body 10 with the inserting slot 211 mutually engaged with the linkage rib 205 of the control valve stem 20, and the upper switch valve 22 in turn is located into the valve chamber 15 thereof with the inserting groove 221 thereof precisely mated with the linkage rib 205 of the control valve stem 20 thereof and the plane edges cut at both sides thereof closely joined to the abutting flanges 212 of the stop disc 21 respectively. The lower switch valve 23 is then guided to the valve chamber 15 till the protrusive locating blocks 231 thereof precisely inserted to the retaining grooves 161 of the control valve body 10 thereof, permitting the upper switch valve 22 to abut closely on top of the lower switch valve 23 thereof. Finally, the coupling end 32 of the valve plug 30 is joined to the valve chamber 15 thereof, permitting the upper packing ring 321 mounted at the coupling end 32 thereof to abut closely against the bottom surface of the lower switch valve 23 and the positioning flange 20 precisely abut against the bottom outer edge of the control valve stem 20 to complete the assembly thereof.

In practical use, the water inlet chambers 222 of the upper switch valve 22 are wide open for the discharge of water. Water coming out from a water inlet pipe C will go through the water inlet hole 31 of the valve plug 30 and flush upwards at the underside of the lower switch valve 23 to flow out through the water inlet pores 232 of the lower switch valve 23 and come into the water inlet chambers 222 of the upper switch valve 22 thereof. Finally, the water flowing out from the water inlet chambers 222 will go through the water outlet holes 16 of the control valve body 10 to be discharged there-from via water outlet pipes to complete the water supply thereof. When the water inlet chambers 222 of the upper switch valve 22 are in a closed-off status, the water inside the water inlet chambers 222 is cut off from the water outlet holes 16 of the control valve body 10 without any water flowing out from the water outlet pipes to shut off the water supply thereof.

However, there are some drawbacks to such conventional water control valve structure for faucets. First, the upper packing ring 321 of the valve plug 30 is simply contacted and abutted against the bottom surface of the lower switch valve 23, which, poor in the mutual engagement thereof, is prone to produce gaps and result in the problem of water leakage. Thus, the conventional water control valve structure is featured by a bad leakage-proof effect. Second, when the control valve body 10 is mounted to the seat cover B of the faucet handle A, the downwards pressure will force the lower packing ring 322 thereof to abut tight against the inner bottom edge of the water inlet pipe C and the upper packing ring 321 to press closer at the bottom surface of the lower switch valve 23 thereof. Under the impact of high water pressure on and off in a long time, the upper and lower switch valves 22, 23 tend to get squeezed and crushed up into pieces.

SUMMARY OF THE PRESENT INVENTION

It is, therefore, the primary purpose of the present invention to provide an interior structure of water control valve for faucets, including a control valve body, a control valve stem, and a valve plug wherein, in the status of water supply, upper/lower water sealing rings mounted predetermined positions of the valve plug thereon will be expanded outwards by water flow to respectively abut tight and close against the inner wall of a connecting cavity of a lower switch valve and that of a valve chamber of the control valve body for more accurate and secure mutual engagement therewith so as to achieve the best leakage-proof effect thereby.

It is, therefore, the second purpose of the present invention to provide an interior structure of a water control valve for faucets wherein the valve plug is made in a stepwise shape with a support face formed therein so that, via appropriate abutting effect of the support face thereof pushed by water flowing through a water inlet hole of the valve plug, the upper edge of a connecting end of the valve plug is strengthened in a closer and tighter engagement with the connecting cavity of the lower switch valve thereof with a proper buffering effect formed in the process thereof as well.

It is, therefore, the third purpose of the present invention to provide an interior structure of a water control valve for faucets wherein the valve plug is integrally made of rubber so that the pressure generated by the downwards-pushing force when the control valve body is mounted to a seat cover of a faucet handle can be appropriately buffered and released from the coupling joint between the bottom end of the valve plug and the inner bottom edge of a water inlet pipe thereby.

DETAILED DESCRIPTION OF THE PREFERRED EMBODIMENTS

Figure 1:
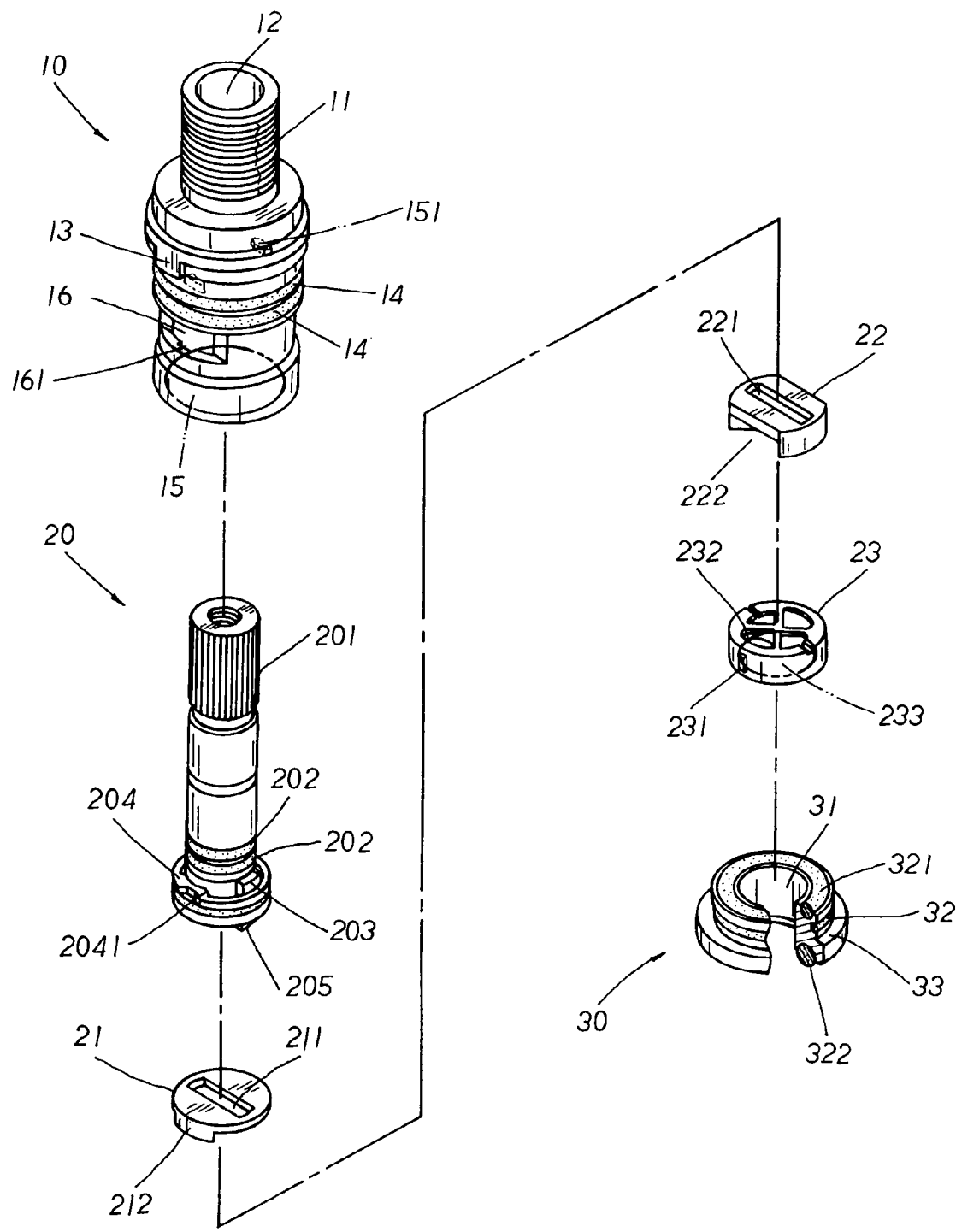
FIG. 1 is an exploded perspective view of a conventional water control valve structure.
Figure 2:
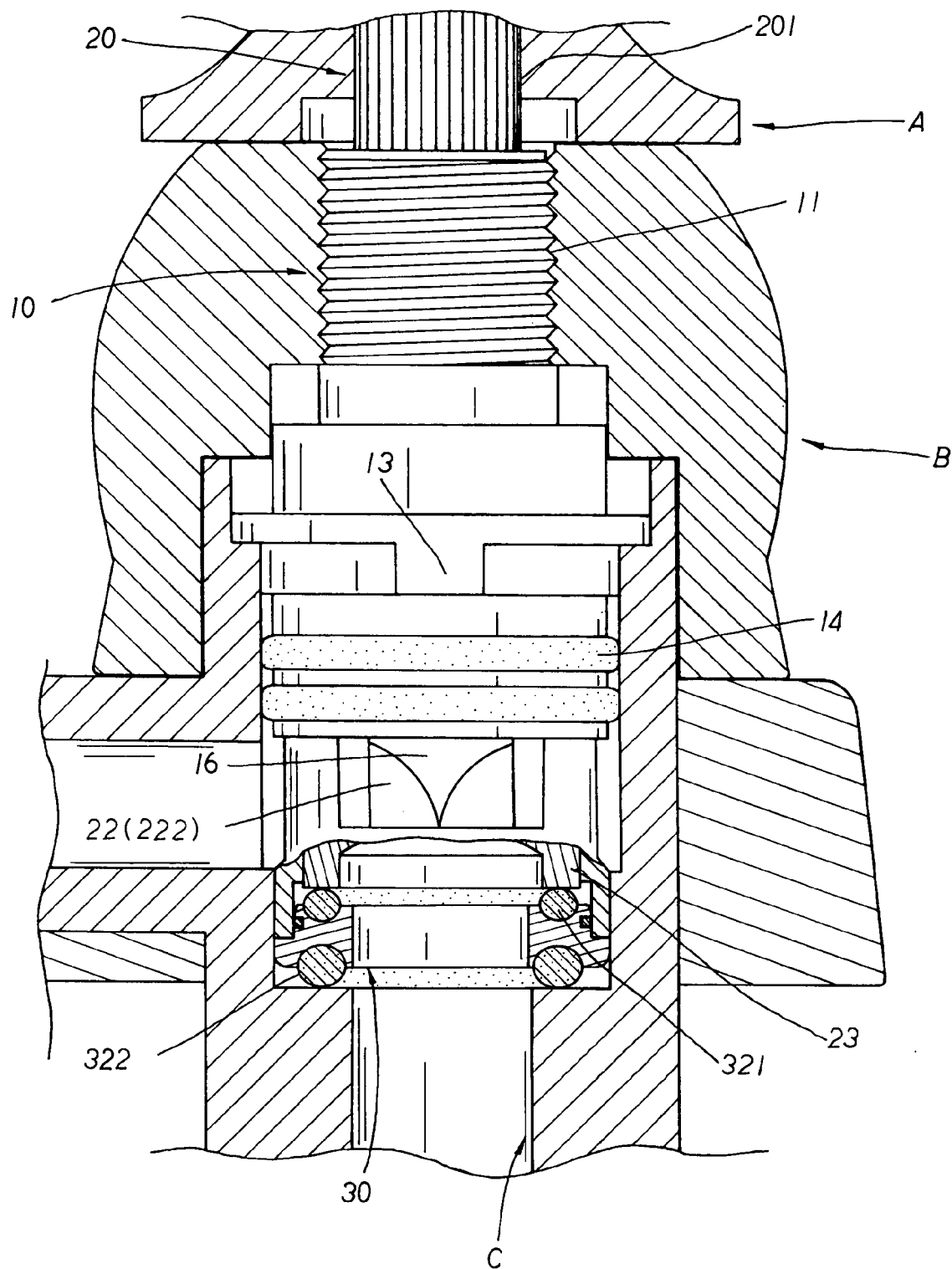
FIG. 2 is a cross sectional view of the conventional water control valve in assembly and in a status of water supply.
Figure 3:
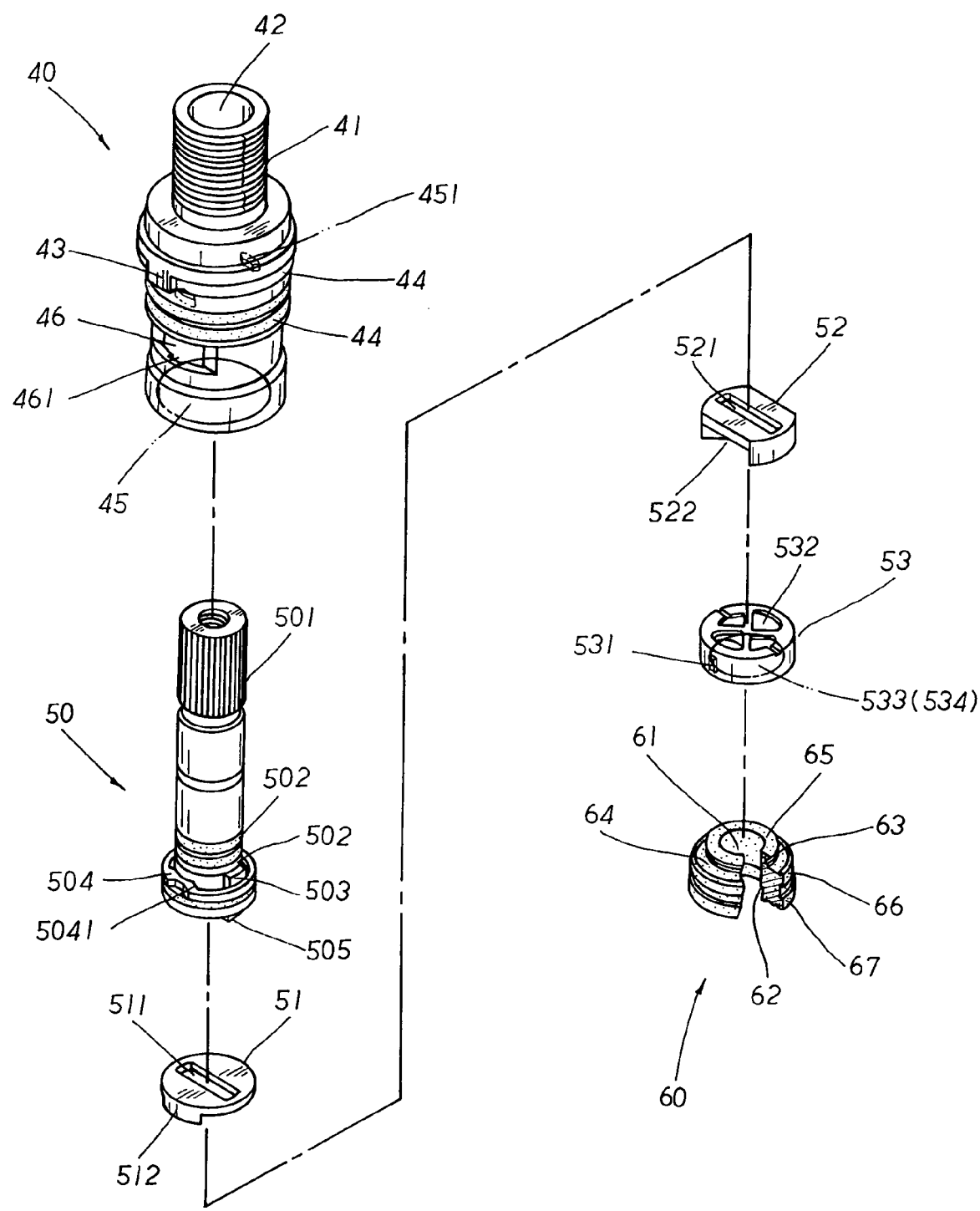
FIG. 3 is an exploded perspective view of the present invention.

Please refer to FIG. 3. The present invention is related to an interior structure of a water control valve for faucets, including a control valve body 40, a control valve stem 50, and a valve plug 60 wherein the control valve body 40, made in a two-stepwise cylindrical shape, is equipped with a coupling end 41 disposed at the upper step thereof to be mutually engaged with a seat cover B of a faucet handle A thereby, a valve stem hole 42 defining the interior of the upper step thereof, a pair of positioning slide blocks 43 symmetrically extending at the upper section of the lower step thereof, and two sealing O-rings 44 mounted at the middle section of the lower step thereof. Inside the lower step of the control valve body 40 thereof is disposed a three-staged valve chamber 45 that, having a lower opening to be communicated with the valve stem hole 42 thereof, is made up of a smaller-diameter upper stage, a medium-diameter middle stage with a pair of limiting blocks 451 symmetrically protruding at the bottom thereon, and a larger-diameter lower stage with a pair of water outlet ports 46 symmetrically cut at proper positions thereon to be mutually connected with the valve chamber 45 thereof and with a pair of retaining grooves 461 symmetrically preset at the water outlet ports 46 thereof. The control valve stem 50 is equipped with an upper engaging end 501 to be mutually registered with the faucet handle A thereof, a plurality of water sealing rings 502 mounted at preset positions thereon, an abutting block 503 with a retaining ring 504 having a pair of symmetrical stop protrusions 5041 properly disposed thereof, and a linkage rib 505 extending at the bottom surface thereon. A stop disc 51 is equipped with an elongate inserting slot 511 disposed at the center thereof and a pair of abutting flanges 512 symmetrically extending downwards at the bottom outer edge thereon. An upper switch valve 52, made in an annular disc with plane edges symmetrically cut at both sides thereof, is provided with an elongate inserting recess 521 indented at the center of the top side thereon, and triangular water inlet chambers 522 each defined by an arcuate surface tilting downwards from both cut edges to the central point thereof. A lower switch valve 53, made in a disk shape, has a pair of protrusive locating blocks 531 symmetrically disposed at both sides of the outer periphery thereof, a plurality of quarter-shaped water inlet ports 532 distributed in a circle at the top surface thereon, and a connecting cavity 533 disposed at the inner wall of the bottom end therein to define a water inlet passageway 534 thereby. The valve plug 60 is integrally made of rubber, having a stepwise central water inlet hole 61 with a support face 62 formed therein, a connecting end 63 protruding at the upper side thereof with a retaining space 64 defining the outer periphery thereof to precisely mate with the lower switch valve 53 thereby, an upper water sealing ring 65 protruding at the top edge of the connecting end 63 thereon, and a plurality of lower water sealing rings 66, 67 sequentially mounted at predetermined positions of the lower end of the valve plug 60 thereof.

Figure 4:
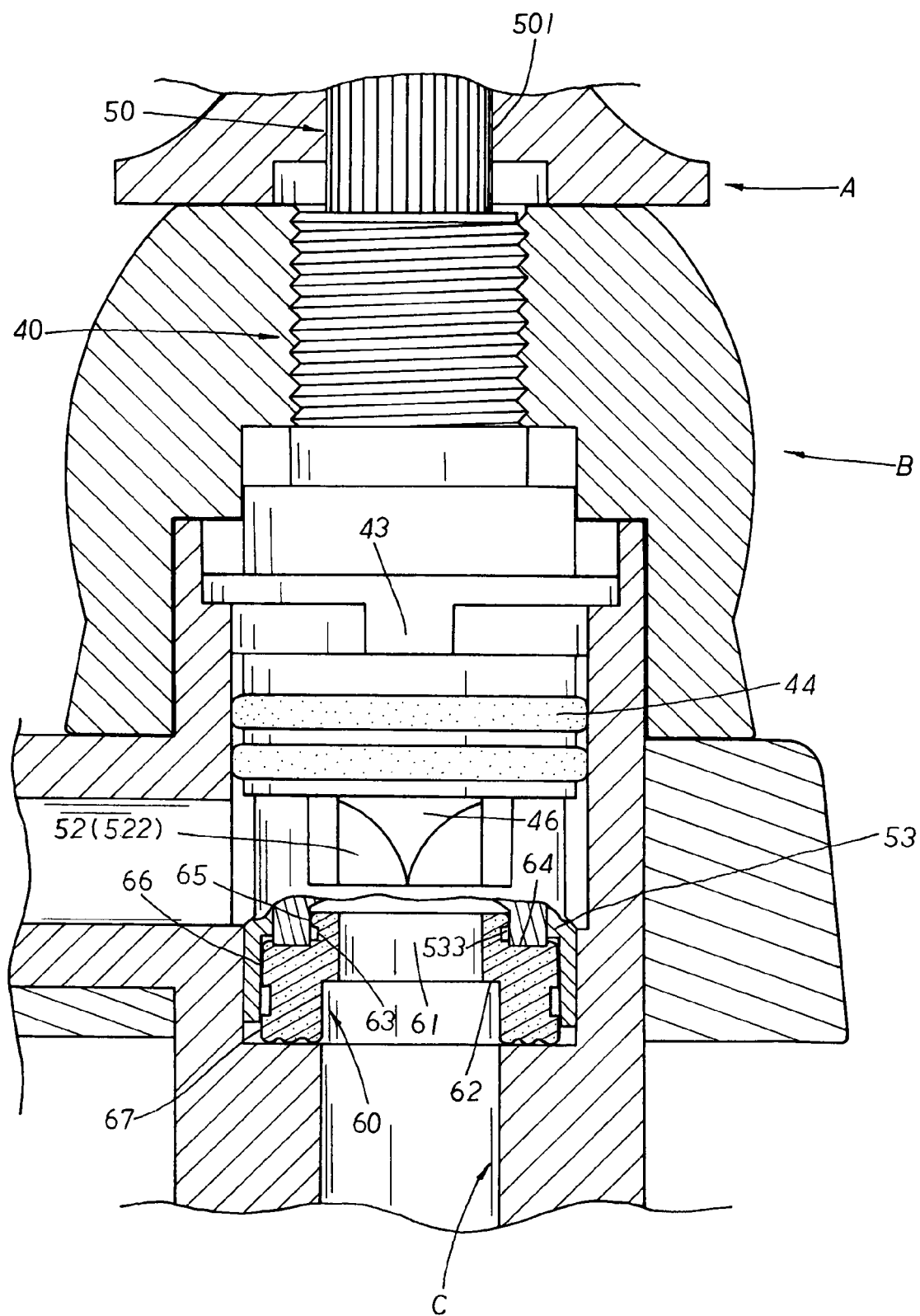
FIG. 4 is a cross sectional view of the present invention in assembly.
Figure 5:
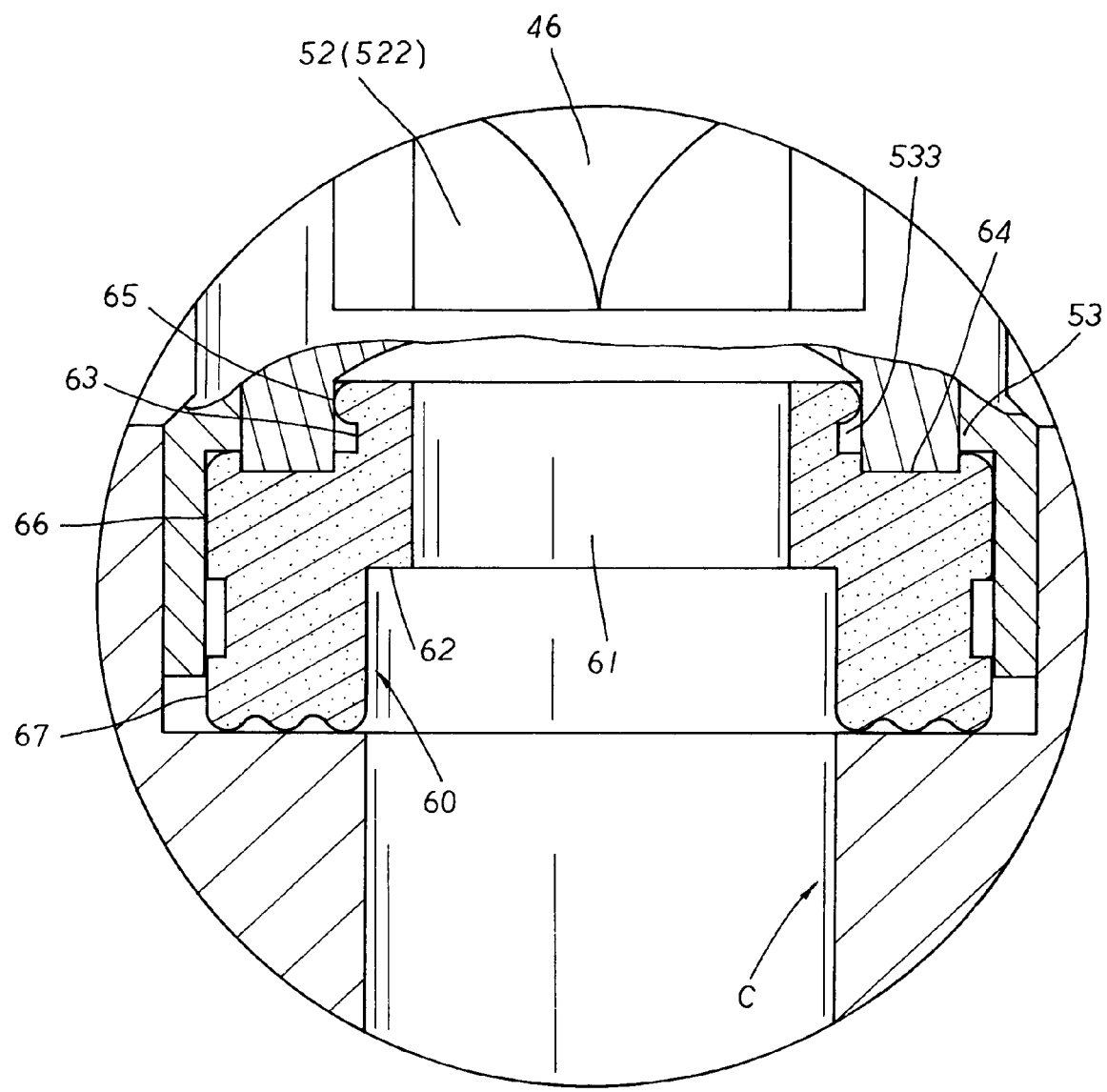
FIG. 5 is a partially enlarged cross sectional view of the present invention in assembly.

Please refer to FIG. 4. In assembly, the control valve stem 50 is joined to the valve chamber 45 of the control valve body 40 thereof, permitting the upper engaging end 501 thereof to extend outside the valve stem hole 42 of the control valve body 40 and the abutting block 503 to locate precisely between the limiting blocks 451 thereof for limited 90-degree movement therein. Then, the stop disc 51 is placed into the valve chamber 45 of the control valve body 40 with the inserting slot 511 mutually engaged with the linkage rib 505 of the control valve stem 50, and the upper switch valve 52 in turn is located into the valve chamber 45 thereof with the inserting groove 521 thereof precisely mated with the linkage rib 505 of the control valve stem 50 thereof and the plane edges cut at both sides thereof closely joined adjacent to the abutting flanges 512 of the stop disc 51 respectively. The lower switch valve 53 is then guided to the valve chamber 45 till the protrusive locating blocks 531 thereof precisely inserted to the retaining grooves 461 of the control valve body 40, permitting the upper switch valve 52 to locate closely on top of the lower switch valve 53 thereof. Finally, the connecting end 63 of the valve plug 60 (referring to FIG. 5) is joined to the valve chamber 45 thereof and mutually registered with the connecting cavity 533 of the lower switch valve 53 thereof, permitting the bottom edge of the lower switch valve 53 to precisely accommodate at the retaining space 64 of the valve plug 60 therein, and the upper water sealing ring 65 of the valve plug 60 to closely abut against the inner wall of the lower switch valve 53 thereby. Meanwhile, the lower water sealing rings 66, 67 of the valve plug 60 are securely abutted against proper positions at the inner wall of the valve chamber 45 to complete the assembly of the present invention.

Figure 6:
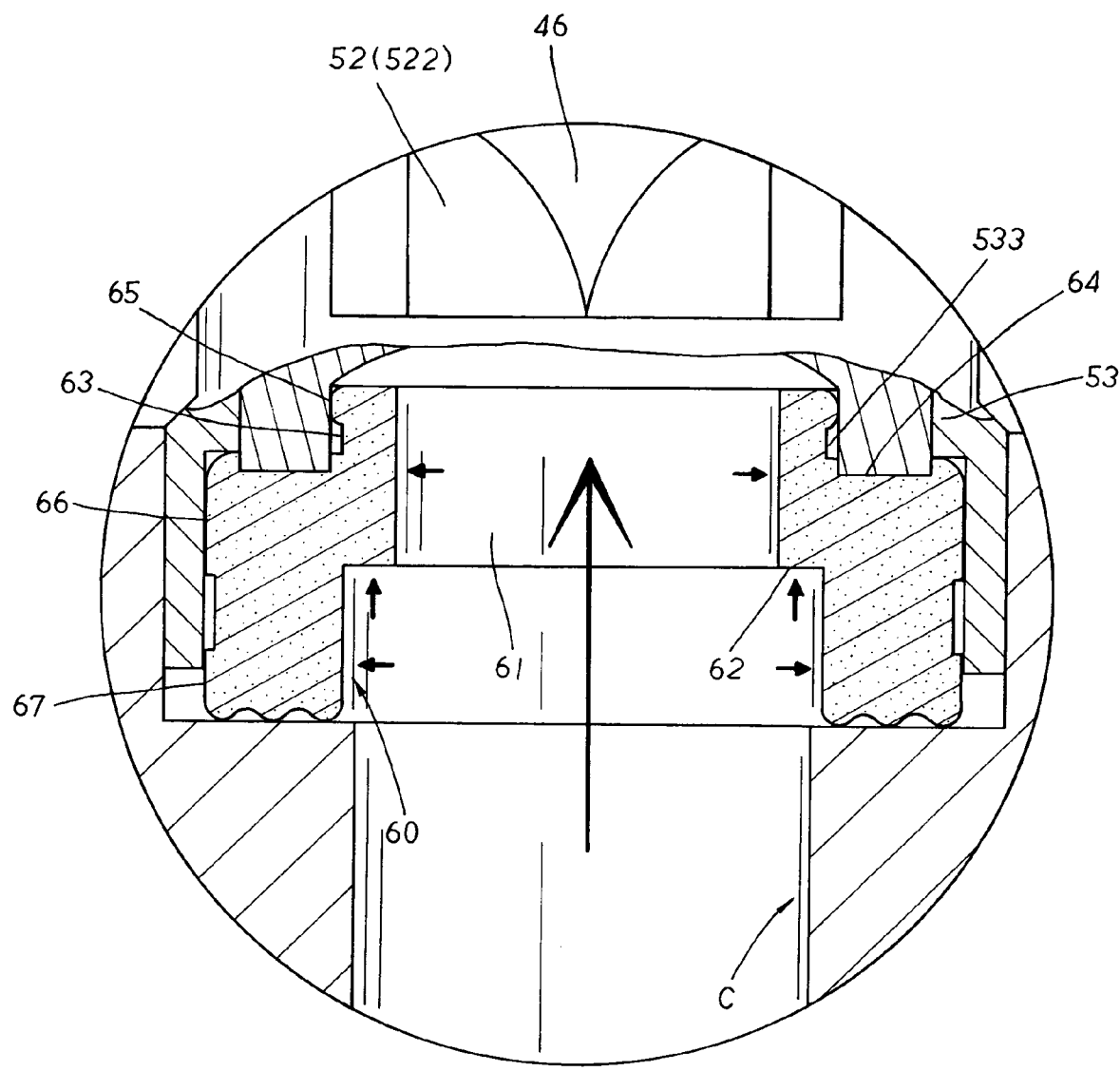
FIG. 6 is a diagram showing the operation of the present invention in water supply.

Please refer to FIG. 6. In the status of water supply, the water inlet chambers 522 of the upper switch valve 52 are wide open for the discharge of water coming out from a water inlet pipe C to go through the water inlet hole 61 of the valve plug 60 thereby. Via appropriate abutting effect of the support face 62 of the valve plug 60 pushed by the water flowing through the water inlet hole 61 thereof, the upper edge of the connecting end 63 of the valve plug 60 is strengthened in a closer and tighter engagement with the connecting cavity 533 of the lower switch valve 53 with a proper buffering effect formed in the process thereof as well. Meanwhile, high water pressure generated by the water flow passing through the water inlet hole 61 of the valve plug 60 will expand outwards the upper and lower water sealing rings 65, 66, 67 of the valve plug 60 thereof to respectively abut tight against the inner wall of the connecting cavity 533 of the lower switch valve 53 and that of the valve chamber 45 of the control valve body 40 for more accurate and secure mutual engagement therewith so as to achieve the best leakage-proof effect thereby. Then, water going through the water inlet passageway 534 of the lower switch valve 53 will flow out through the water inlet pores 534 of the lower switch valve 53 and come into the water inlet chambers 522 of the upper switch valve 52 thereof. Finally, the water flowing out from the water inlet chambers 522 will go through the water outlet holes 46 of the control valve body 40 to be discharged there-from via water outlet pipes to complete the water supply thereof. When the water inlet chambers 522 of the upper switch valve 52 are in a closed-off status, the water inside the water inlet chambers 522 is cut off from the water outlet holes 46 of the control valve body 40 so that no water will flow out from the water outlet pipes and the water supply can be completely shut off. Therefore, via the aforementioned interior structure thereof, the valve plug 60, under high water pressure of the water supply, can be accurately and tightly engaged with the lower switch valve 53 so as to effectively avoid the problem of water leakage.

What is claimed is:

1. An interior structure of a water control valve for faucets, including a control valve body, a control valve stem, and a valve plug wherein the control valve body of a two-stepwise cylinder is equipped with an upper coupling end with a valve stem hole defining therein, a pair of positioning slide blocks symmetrically extending at preset positions thereon, and two sealing O-rings mounted at the middle section thereof; inside the lower step of the control valve body thereof is disposed a valve chamber communicating with the valve stem hole thereof and having a pair of limiting blocks symmetrically protruding at preset inner wall thereon, a pair of water outlet ports symmetrically cut at proper positions thereon to be mutually connected with the valve chamber thereof, and a pair of retaining grooves symmetrically preset at the water outlet ports thereof; the control valve stem is equipped with an upper engaging end, a plurality of water sealing rings mounted at preset positions thereon, an abutting block with a retaining ring properly disposed thereof, and a linkage rib extending at the bottom side thereon; a stop disc is equipped with an elongate inserting slot disposed at the center thereof and a pair of abutting flanges symmetrically extending downwards at the bottom outer edge thereon; an upper switch valve, having plane edges symmetrically cut at both sides thereof, is provided with an elongate inserting recess indented at the center of the top side thereon, and water inlet chambers each defined by an arcuate surface tilting downwards from both cut edges to the central point thereof; a lower switch valve has a pair of protrusive locating blocks symmetrically disposed at both sides of the outer periphery thereof, and a plurality of water inlet ports disposed at the top surface thereon with a water inlet passageway formed therein; the present invention being characterized by that, the lower switch valve is provided with a connecting cavity disposed at the inner bottom end therein, and the valve plug has a central water inlet hole with a support face formed therein, a connecting end protruding at the upper side thereof with a retaining space defining the outer periphery thereon, an upper water sealing ring protruding at the top edge of the connecting end thereon, and a plurality of lower water sealing rings appropriately mounted at the lower end of the valve plug thereof;

therefore, in the status of water supply, high water pressure generated by the water flow passing through the water inlet hole of the valve plug will expand outwards the upper and lower water sealing rings of the valve plug thereof to respectively abut tight against the inner wall of the connecting cavity of the lower switch valve and that of the valve chamber of the control valve body for more accurate and secure mutual engagement therewith so as to achieve the best leakage-proof effect thereby; meanwhile, via appropriate abutting effect of the support face of the valve plug pushed by the water flow thereof, the upper edge of the connecting end of the valve plug is strengthened in a closer and tighter engagement with the connecting cavity of the lower switch valve with a proper buffering effect formed in the process thereof so as to effectively avoid the problem of water leakage.

2. The interior structure of a water control valve for faucets as claimed in claim 1 wherein the valve plug thereof is integrally made of rubber.

3. The interior structure of water control valve for faucets as claimed in claim 1 wherein the central water inlet hole of the valve plug thereof is made in a step-wise shape.

* * * * *